United States Patent
Warnecke

[11] Patent Number: 5,728,188
[45] Date of Patent: Mar. 17, 1998

[54] GLASS GOB DISTRIBUTOR ZEROING FIXTURE AND METHOD OF ORIENTING A GLASS GOB DISTRIBUTOR

[75] Inventor: Ronald P. Warnecke, Grand Rapids, Ohio

[73] Assignee: Owens-Brockway Glass Container Inc., Toledo, Ohio

[21] Appl. No.: 620,229

[22] Filed: Mar. 22, 1996

[51] Int. Cl.⁶ .................................................... C03B 7/14
[52] U.S. Cl. ............................ 65/17.1; 65/27; 65/127; 65/171; 65/303; 65/304; 65/375; 29/464; 29/466; 29/271
[58] Field of Search .................. 65/17.1, 27, 127, 65/171, 225, 303, 304, 323, 375; 29/464, 466, 271, 272

[56] References Cited

U.S. PATENT DOCUMENTS

| | | | |
|---|---|---|---|
| 3,555,804 | 1/1971 | Murph | 29/464 |
| 4,529,431 | 7/1985 | Mumford | 65/225 |
| 4,566,894 | 1/1986 | Kulig et al. | 65/225 |
| 4,740,227 | 4/1988 | Bratton et al. | 65/171 |
| 5,135,559 | 8/1992 | Sasso et al. | 65/225 |
| 5,213,602 | 5/1993 | Foster et al. | 65/225 |
| 5,254,150 | 10/1993 | Reimer et al. | 65/225 |

FOREIGN PATENT DOCUMENTS 0 600 185 A1   6/1994   European Pat. Off. .

Primary Examiner—Steven P. Griffin

[57] ABSTRACT

A method of accurately circumferentially orienting the output shaft of each of a plurality of oscillating gob distribution device units (S) with respect to one another and with respect to a support device (T) used to support a plurality of gob chutes. A fixture (10) having a slot (22) extending therethrough is secured to the output shaft of each of the drive units and in a fixed circular position relative thereto. The positions of the output shafts are adjusted to bring the slots into alignment with one another by inserting the shank portion (42) of a zeroing bar (40) into the slots of the fixtures, and the position of the support device is circumferentially adjusted to bring a recess therein into a predetermined circular orientation with respect to a step end portion (46) of the zeroing bar. The support devices are then vertically positioned with respect to one another by positioning the position bars (64) of a step fixture (60) into recesses (26) of the fixtures, the step fixture having portions that are adapted to engage the support devices when the support devices are properly vertically positioned.

8 Claims, 2 Drawing Sheets

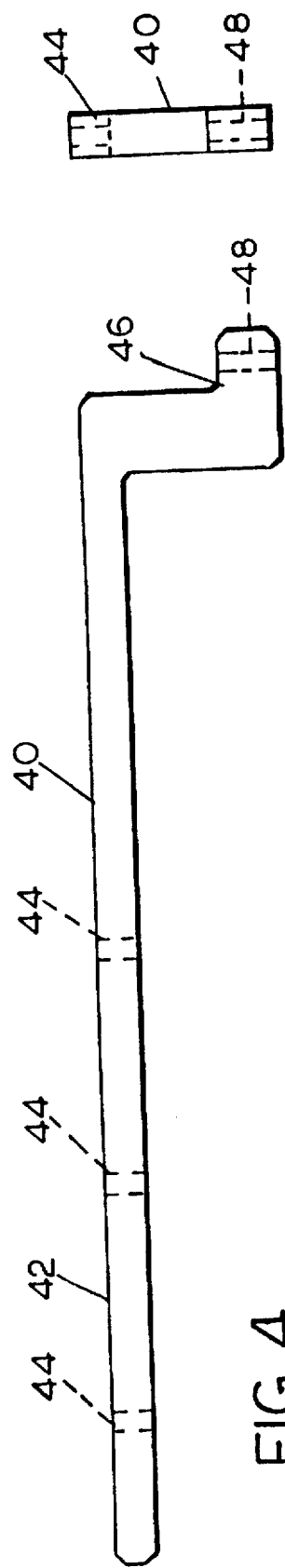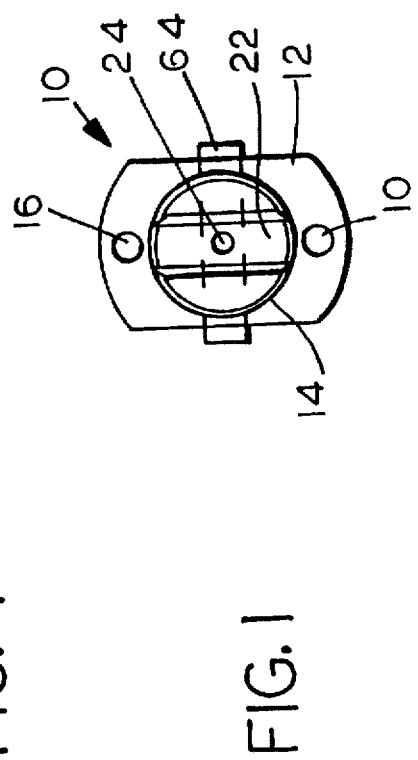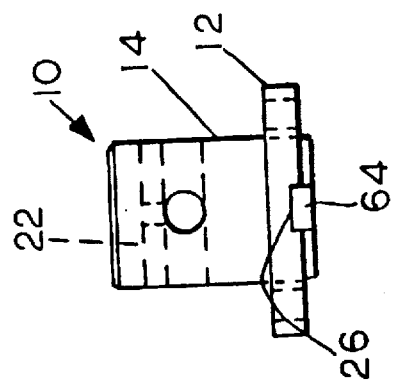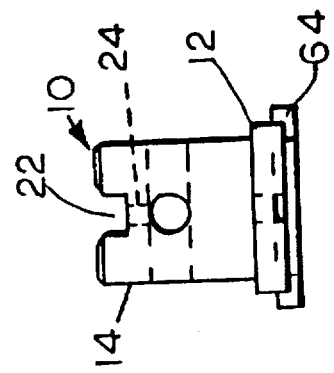

GLASS GOB DISTRIBUTOR ZEROING FIXTURE AND METHOD OF ORIENTING A GLASS GOB DISTRIBUTOR

FIELD OF THE INVENTION

This invention relates to a fixture for precisely positioning an oscillating molten glass gob chute with respect to a fixed gob trough during the passage of a gob from the chute to the trough on its way to a molding machine for molding hollow glass articles, such as bottles and jars, from glass gobs.

BACKGROUND OF THE INVENTION

Glass containers are typically formed by an I.S. machine, that is, a machine with multiple side-by-side sections, such as six or eight or even ten sections, and in modern practice multiple containers, such as three or four containers, are often simultaneously formed at each section by a process commonly referred to as the multiple gob process. In any case, a gob distributor is required to sequentially distribute gobs of molten glass to each section of an I.S. machine, and a multiplicity of such gob distributors are required for a multiple gob I.S. machine, one gob distributor for each of the sets of molds (blank molds/container molds) of an I.S. machine section.

Each gob distributor of the type described above has a curved scoop and requires a drive unit to index an oscillating member to which the scoop is attached. The oscillating member is driven in a series of incremental steps as the scoop sequentially aligns itself with a series of gob chutes, one chute leading to one of the blank molds at each of the sections of the I.S. machine. During the pause of the gob distributor scoop at each I.S. machine section chute, a gob of molten glass from an outlet orifice of the feeder bowl of a glass melting furnace forehearth, after severing of a stream of molten glass therefrom into a gob of predetermined weight, passes through the scoop of the distributor and then through the chute into a blank mold of the I.S. machine section. The scoop of the gob distributor must be at rest as the gob passes therethrough, to avoid slinging of the gob due to centrifugal force, and it must be very precisely aligned with the blank mold chute as the gob passes from the scoop into the chute. Known prior art I.S. machine gob distributor systems generally corresponding to the above are disclosed in U.S. Pat. No. 5,135,559 (Sasso et al) and in U.S. Pat. No. 4,529,431 (Mumford), the disclosure of each of which is incorporated by reference herein.

SUMMARY OF THE INVENTION

In accordance with the present invention there is provided a method of and devices for precisely circumferentially positioning the output shaft of a gob distributor drive mechanism, especially a servo-driven drive mechanism, with respect to structure used to support a plurality of gob delivery troughs, one of such troughs being utilized for each section of the I.S. machine being fed with gobs from such gob distributor. The invention employs a fixture that is temporarily affixed to the output shaft of a gob distributor drive unit in a fixed circumferential position with respect to the position of the gob distributor output drive shaft. Modern I.S. machine glass forming practice usually employs multiple sets of molds at each machine section, for example, three sets of molds at each machine section, in a process commonly referred to as multiple gob operation. In a multiple gob I.S. machine operation, a device according to the present invention is affixed to the output shaft of each of the gob distributor drive units, for example, three such units for a triple gob I.S. machine. In any case, each of the fixtures is applied to an output shaft of a gob distributor drive unit S, and then each gob distributor output shaft is "zeroed," or adjusted to a fixed circumferential position. The device that is affixed to each of the gob distributor output shafts has an opening extending therethrough, and it is known that the output shafts of the gob distributors are properly positioned with respect to one another when the openings in the fixtures attached to such output shafts are in alignment with one another. Further, to ensure that the output shafts of the gob distributors are properly positioned with respect to the gob troughs, a zeroing bar is inserted in the opening of each of the gob distributor output shaft fixtures, and the zeroing bar is further inserted in an opening on the structure used to suspend the gob delivery troughs, to ensure that the angular position of each gob distributor drive unit output shaft is in a proper circumferential position with respect to the various gob troughs that the gob delivery chutes must be aligned with during the passage of a gob from a gob chute to a gob trough. Further, in an I.S. machine installation with computer controlled, servo-driven gob distributors, the zeroing of the gob distributor output shafts with respect to one another and with respect to the positions of the gob troughs provides an accurate starting position for use in a computer controlled system.

Accordingly, it is an object of the present invention to provide a method of, and apparatus for, accurately circumferentially positioning the output shafts of gob distributor drive units with respect to one another, and with respect to the positions of gob delivery troughs with which the gob delivery chute must be precisely instantaneously aligned during the oscillating movement of the gob chutes.

For a further understanding of the present invention and the objects thereof, attention is directed to the drawing and the following brief description thereof, to the Detailed Description of the Preferred Embodiment of the Invention and to the appended claims.

BRIEF DESCRIPTION OF THE DRAWING

FIG. 1 is a plan view of a glass gob chute drive unit output shaft fixture according to a preferred embodiment of the present invention and for use in the practice of the method of the present invention;

FIG. 2 is a front elevational view of the fixture of FIG. 1;

FIG. 3 is a side elevational view of the fixture of FIGS. 1 and 2;

FIG. 4 is an elevational view of a zeroing bar for use in conjunction with a plurality of fixtures according to the fixture of FIGS. 1–3 in the practice of the method of the present invention;

FIG. 5 is an end elevational view of the zeroing bar of FIG. 4;

DETAILED DESCRIPTION OF THE PREFERRED EMBODIMENT

Figure 6:
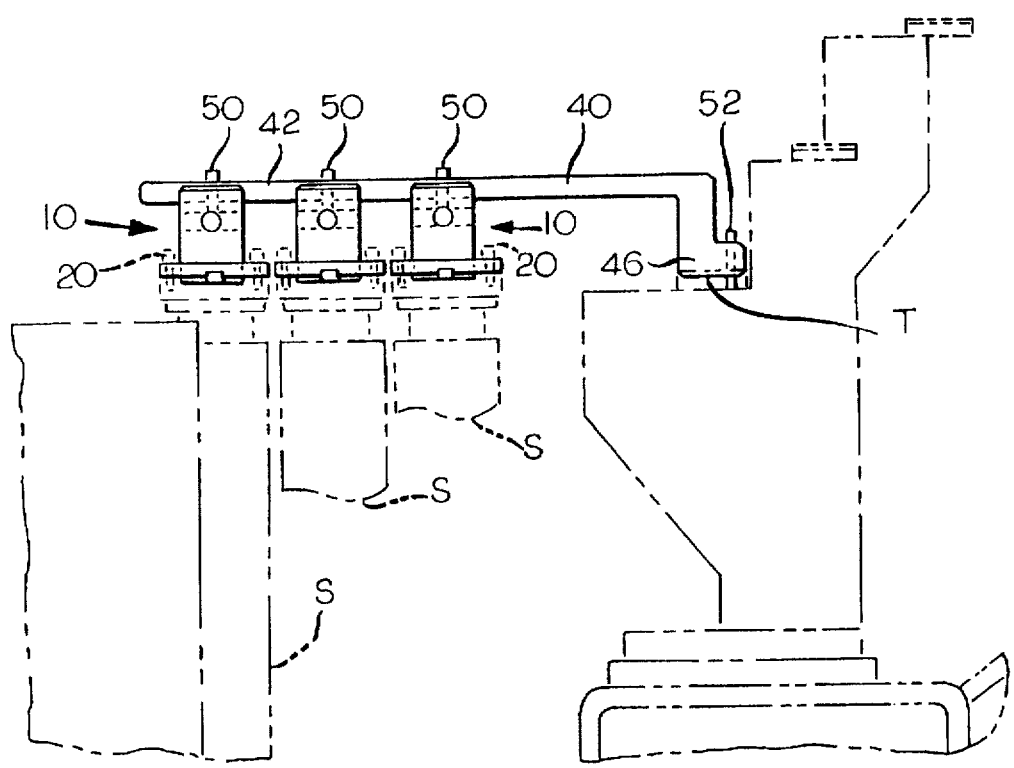
FIG. 6 is a schematic view illustrating the use of a plurality of fixtures according to FIGS. 1–3 with a zeroing bar according to FIGS. 4–5 in the practice of the method of the present invention.

A fixture for use in the practice of the method of the present invention is indicated generally by reference numeral 10 and is made up of a flange 12 with a spindle 14 welded or otherwise secured to a surface of the flange 12. The flange 12 has a diametrically opposed pair of bolt holes 16, 18 extending therethrough, and the bolt holes 16, 18 are used to receive bolts 20 (FIG. 6) to accurately circumferentially position the fixture 10 to an output shaft of a servo-driven drive unit S (FIG. 6) of the glass gob distributor of a type used in conjunction with a glass container forming machine of the I.S. type. In that regard, a gob distributor of the servo-driven unit type employs one drive unit for each set of molds per machine section, and FIG. 6 illustrates an installation with three servo-driven drive units S, which is the preferred arrangement for a triple gob I.S. machine.

The spindle 14 of each fixture 10 has a diametrical slot 22 in an uppermost surface thereof, and the output shafts of the drive units S are accurately circumferentially positioned with respect to one another when the diametrical slot 22 of each spindle is accurately aligned with the diametrical slot 22 of the spindle of each of the other drive units S. In that regard, a zeroing bar 40 is used to ensure that the fixtures 10 are accurately circumferentially positioned with respect to one another, the zeroing bar 40 having a shank 42 that is sufficiently long to be simultaneously received in the slot 22 of the mixture 10 that is affixed to each of the drive units S. For proper retention of each zeroing bar 40 with respect to each fixture 10 during a zeroing operation, the zeroing bar 40 is temporarily secured to each fixture 10 by bolts 50 (FIG. 6) that pass through bolt holes 44 in the shank 42 of the zeroing bar 40, and the bolts 50 are threadably received in bolt holes 24 in the bottom of each slot 22 of each fixture 10.

When the zeroing bar 40 is in place with respect to the fixture 10 of each of the drive units S, as heretofore described, a gob trough support member T is then accurately circumferentially aligned with respect to the zeroing bar 40, and thereby with respect to the output shaft of each of the drive units S, by circumferentially, and vertically if required, adjusting the support member T so that a recess therein receives a stepped free end portion 46 of the zeroing bar 40. In that regard, the free end portion 46 of the zeroing bar 40, which is vertically offset from the shank portion 42 is provided with a bolt hole 48 extending therethrough, and the zeroing bar 40 is temporarily secured to the member T by a roll pin 52.

Figures 7, 8:
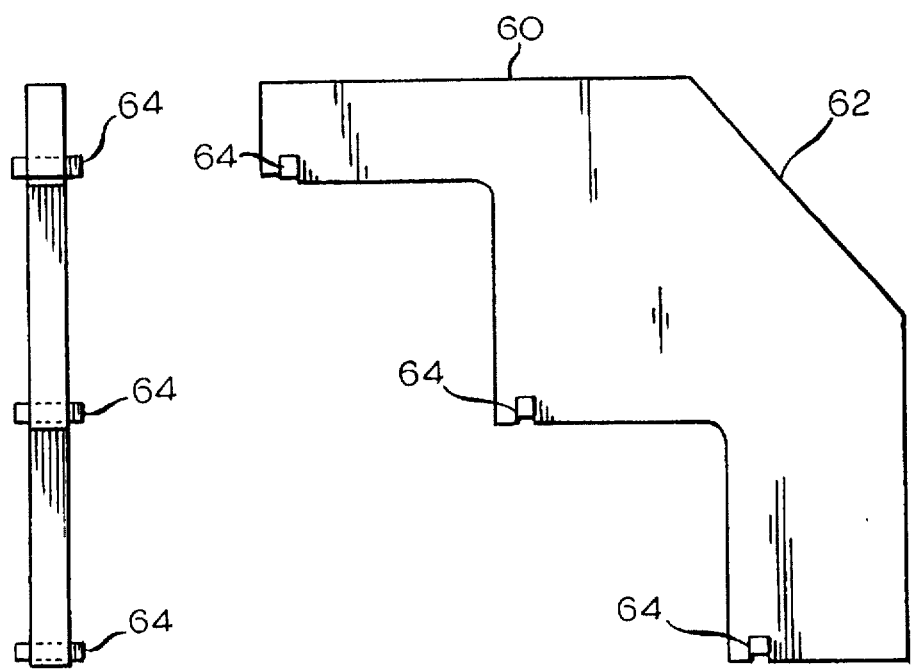
FIG. 7 is an elevational view of a step fixture that is useful in practicing a feature of the method of the present invention.
FIG. 8 is an end view of the step fixture of FIG. 7.

A step fixture 60, as shown in FIGS. 7 and 8, is provided to adjust the relative vertical spacing between each gob trough support device T, the various gob trough support devices T being positioned in a generally vertical stack with respect to one another. The proper vertical positioning of each support device T is important to ensure that there is no interference, or excessive clearance, between the inlets to the gob troughs supported by such support device T and the outlet of the oscillating gob chute that delivers gobs of molten glass to such gob troughs. To that end, the step in the step end portion 46 of the zeroing bar 40 is configured to precisely vertically position the support device T in which the stepped end portion 46 of the zeroing bar 40 is received with respect to the drive units S, but each other support device T is independently adjustable in a vertical direction with respect to the support device T that receives the zeroing bar 40. The step fixture 60 is made up of a plate 62 and a series of positioning bars 64 secured to the plate 62 and extending transversely therefrom, the positioning bars 64 being spaced vertically and horizontally with respect to one another. During the zeroing of the circumferential position of each support device T with respect to the output shaft of each drive unit S, which takes place after the removal of the zeroing bar 40 from the fixtures 10, the step fixture 60 is positioned with respect to the drive units S so that each positioning bar 64 is received in a diametrically extending recess 26 at the bottom of one or another of the fixtures 10 used in zeroing the circumferential positions of the output shafts of the drive units S. In that regard the recess 26 of each fixture 10 is vertically offset from the slot 22 of such fixture 10 and lies in a vertical plane that extends at a right angle to the vertical plane in which the slot 22 lies. The plate 62 of the step fixture 60 is configured to contact each gob trough support device T when each such device is at a proper elevation.

Once the output shafts of the drive units S are properly circumferentially oriented with respect to one another and with respect to each gob trough support device T, and each gob trough support device is properly vertically positioned with respect to each other gob trough support device T, the step fixture 60 is removed and the fixture 10 is removed from each drive unit S, so that each drive unit S can then be connected to the gob distributor chute to be driven thereby.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. A method of accurately circumferentially positioning an output shaft of a drive unit of an oscillating, molten glass gob distributor device with respect to a support device to be used to support a plurality of fixed gob distributor troughs, said method comprising:

securing a fixture to the output shaft in a predetermined circumferential position relative to the output shaft, the fixture having an opening extending therethrough; and circumferentially orienting the opening of the fixture in reference to the support device by positioning an elongate zeroing bar partly in the opening of the fixture and partly in an opening in the support device.

2. A method according to claim 1 and further comprising:

removing the zeroing bar in the fixture before operating the drive unit of the molten glass gob distributor device to distribute gobs of molten glass to the plurality of fixed gob distributor troughs.

3. A method of accurately circumferentially positioning an output shaft of each of a plurality of oscillating, molten glass gob distributor drive units with respect to each other and with respect to a support device used to support a plurality of fixed gob distributor troughs, the method comprising:

providing a plurality of orienting fixtures, each of the orienting fixtures having an opening extending therethrough;

securing an orienting fixture to the output shaft of each of the gob distributor drive units in a predetermined circumferential position with respect to the output shaft;

circumferentially orienting the fixtures with respect to one another by aligning the opening in each of the fixtures with the opening in each of the other fixtures; and circumferentially orienting the support device with respect to the openings in each of the fixtures.

4. A method according to claim 3 wherein the support device has an opening therein and wherein the steps of circumferentially orienting the fixtures with respect to one another and circumferentially orienting the support device with respect to the openings in each of the fixtures are performed by:

providing an elongate zeroing bar having a shank portion and an end portion;

inserting the shank portion of the zeroing bar into the openings in each of the fixtures; and inserting the end portion of the zeroing bar into the opening in the support device.

5. An oscillating molten glass gob distribution drive unit in combination with a fixture for precisely circumferentially orienting an output shaft of the oscillating molten glass gob distribution drive unit with respect to a support device used to support a plurality of gob troughs affixed to the support device, said fixture comprising;

a spindle, said spindle having an opening extending therethrough; and means for securing said spindle to the output shaft in a fixed circumferential position relative to the output shaft.

6. An oscillating molten glass gob distribution drive unit in combination with a fixture for precisely circumferentially orienting an output shaft of the oscillating molten glass gob distribution drive unit with respect to a support device used to support a plurality of gob trough affixed to the support device according to claim 5 wherein said spindle comprises an upper surface, and wherein the opening is a diametrically extending slot in the upper surface of said spindle.

7. A method of accurately circumferentially positioning an output shaft of each of a plurality of oscillating, molten glass gob distributor drive units with respect to each other and with respect to one of a plurality of support devices used to support a plurality of fixed gob distributor troughs, the method comprising:

providing a plurality of orienting fixtures, each of the orienting fixtures having an opening extending therethrough;

securing an orienting fixture to the output shaft of each of a first plurality of gob distributor drive units in a predetermined circumferential position with respect to the output shaft;

circumferentially orienting the fixtures secured to the output shaft of each of the first plurality of drive units with respect to one another by aligning the opening in each of the fixtures with the opening in each of the other fixtures; and circumferentially orienting one of the support devices with respect to the openings in each of the fixtures of each of the first plurality of drive units.

8. A method according to claim 7 wherein the one of the support devices has an opening therein and wherein the steps of circumferentially orienting the fixtures secured to the output shafts of each of the first plurality of drive units with respect to one another and circumferentially orienting the one of the plurality of support devices with respect to the openings in each of the fixtures are performed by:

providing an elongate zeroing bar having a shank portion and an end portion;

inserting the shank portion of the zeroing bar into the openings in each of the fixtures secured to the output shafts of each of the first plurality of drive units; and inserting the end portion of the zeroing bar into the opening in the one of the support devices.

\* \* \* \* \*